United States Patent
Childress et al.

(10) Patent No.: US 7,877,791 B2
(45) Date of Patent: Jan. 25, 2011

(54) SYSTEM, METHOD AND PROGRAM FOR AUTHENTICATION AND ACCESS CONTROL

(75) Inventors: Rhonda L. Childress, Austin, TX (US); Oded Dubovsky, Haifa (IL); Itzhack Goldberg, Hadera (IL); Ido Levy, Kiryat Mozkin (IL); Stephen James Watt, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 11/765,188

(22) Filed: Jun. 19, 2007

(65) Prior Publication Data

US 2008/0320574 A1 Dec. 25, 2008

(51) Int. Cl.
*H04L 9/32* (2006.01)
*H04L 9/00* (2006.01)
*G06F 7/04* (2006.01)

(52) U.S. Cl. .............................. 726/5; 726/27; 726/28; 726/29; 726/30; 713/168; 713/169; 713/170; 713/171; 713/172

(58) Field of Classification Search .................. 726/5
See application file for complete search history.

(56) References Cited

U.S. PATENT DOCUMENTS

| 5,544,246 | A | 8/1996 | Mandelbaum et al. |
| 6,883,100 | B1 * | 4/2005 | Elley et al. ..................... 726/5 |
| 7,093,125 | B2 | 8/2006 | Robb et al. |
| 2006/0039564 | A1 | 2/2006 | Rao |
| 2006/0137000 | A1 | 6/2006 | Isaacson |
| 2006/0236118 | A1 | 10/2006 | Goldberg |

OTHER PUBLICATIONS

"Challenge-Response Password Reset System", https://onyen.unc.edu/cgi-bin/unc_id/chpwqa.pl; 1 page.
"PennKey Challenge-Response Password Reset Authenticating (Identifying) Yourself", https:galaxy.isc-seo.upenn.edu:7778/pls/com8i/Challenge_Controller_pg.Start_Challenge; 1 page.
"Challenge-Response Password Reset Option", http://www.upenn.edu/computing/pennkey/setreset/cr.html' 1 page.

* cited by examiner

*Primary Examiner*—Longbit Chai
(74) *Attorney, Agent, or Firm*—Arthur Samodovitz

(57) ABSTRACT

System, method and program for managing a production server. An authentication server sends to the production server via a network a group password for a GroupID to access a file in the production server. A user at a workstation sends via a network to the authentication server an individual UserID and corresponding individual password for the user and a request for the group password for the GroupID to access a file in the production server protected by the group password. In response, the authentication server authenticates the individual UserID with the corresponding individual password and returns to the workstation the group password for the GroupID. After receiving the group password from the authentication server, the user at the workstation sends via a network to the production server the group password and GroupID and a request to access the file in the production server protected by the group password. In response, the production server authenticates the GroupID with the group password and grants the user access to the file.

21 Claims, 3 Drawing Sheets

SYSTEM, METHOD AND PROGRAM FOR AUTHENTICATION AND ACCESS CONTROL

FIELD OF THE INVENTION

The invention relates generally to computer systems, and more specifically to authentication and access control.

BACKGROUND OF THE INVENTION

Before allowing a person to access a sensitive computer system or application (and the data it manages), it is well known and common for the computer system or application to authenticate the person and if the person is authentic, check whether the person is authorized to access the computer system or application. Typically, authentication is based on a valid combination of User ID and password provided by the person. Typically, authorization is based on an Access Control List maintained by the computer system or application. The Access Control List lists the User IDs which are authorized to access the computer system or application (and the data it manages).

Different applications and files within a computer system may require different "levels" of access. The highest level of access to the most sensitive applications and files is typically called "root" access (or administrator access). Typically, root access is reserved for administrators, and allows the administrators to execute the most sensitive applications and change the most sensitive files. Examples of applications that typically require root access are mount, passwd. Examples of files that typically require root access are /etc/passwd, /etc/group, /etc/shadow. Users typically have the lowest level of access, called "user" access, and this allows the user to use less sensitive applications and access less sensitive files. In some cases, root access is required to change a file, such as a /etc/fs or /etc/passwd configuration file, but user access is sufficient to read the same file.

Some Ds and passwords are created and used by respective individuals. Other Ds and passwords are assigned to and used by a group of people. Most security policies require that passwords be changed periodically, such as every six months. This limits unauthorized exposure of the sensitive application or file if a hacker learns a valid combination of User ID and password of an authorized person or group. In the case of individual User IDs and individual passwords associated with respective individuals, the user changes his or her password periodically as required by the security policy. In the case of a "group" User ID and password, it is common for one person in the group to periodically change the password, according to the security policy.

It was known to allow a person to obtain a new password for a system or application before expiration of the current password by the person entering the person's current password.

It was known to allow a person to obtain a new password for a system or application after expiration of the current password by the person entering the person's expired password.

It was known to allow a person to obtain a new password after expiration of the current password by the person entering a User ID and the authentication system sending the new, system generated password to an e-mail address previously registered for the User ID. Next, the person can enter the system-generated password along with a new person-generated password to substitute the person-generated password for the system-generated password.

Often, the person forgets the person's current or expired password. In such a case, it was known to allow such a person to reset the person's current or expired password by a challenge/response process. In this process, an authentication program poses a series of challenges or questions to the person, such as requests for the person's mother's maiden name, the name of the street where the person grew up, etc., in addition to the person's User ID. (The person provided the answers to the challenges or questions upon original registration.) If the person answers the questions properly, then the system allows the person to obtain a new password for the current User ID. A typical challenge/response process to obtain a new password is not as secure as requiring the current or expired password to obtain a new password. This is because the typical challenges/responses, while not widely known, are not secret and are not protected as secrets.

As explained above, in the case of a group User ID and group password, typically one person in the group (a "super administrator") changes the group password periodically (by furnishing the current or expired password for authentication) as required by the security policy. For a large computer system with a large number of computers, applications and files, there may be a large number of administrators (up to one hundred), each requiring root access. In such a case, each time the group password is changed, the person who changed the group password sends the group password electronically (such as by e-mail) to each administrator, and each administrator typically makes a record of the new password. There have been difficulties in ensuring that each administrator (a) receives the new group password, and (b) if received, retains a copy of the password in a secure manner.

An object of the present invention is to better control distribution of group passwords to authorized users.

SUMMARY OF THE INVENTION

The present invention resides in a system, method and program for managing a production server. An authentication server sends to the production server via a network a group password for a GroupID to access a file in the production server. A user at a workstation sends via a network to the authentication server an individual UserID and corresponding individual password for the user and a request for the group password for the GroupID to access a file in the production server protected by the group password. In response, the authentication server authenticates the individual UserID with the corresponding individual password and returns to the workstation the group password for the GroupID. After receiving the group password from the authentication server, the user at the workstation sends via a network to the production server the group password and GroupID and a request to access the file in the production server protected by the group password. In response, the production server authenticates the GroupID with the group password and grants the user access to the file.

DETAILED DESCRIPTION OF THE PREFERRED EMBODIMENTS

Figure 1:
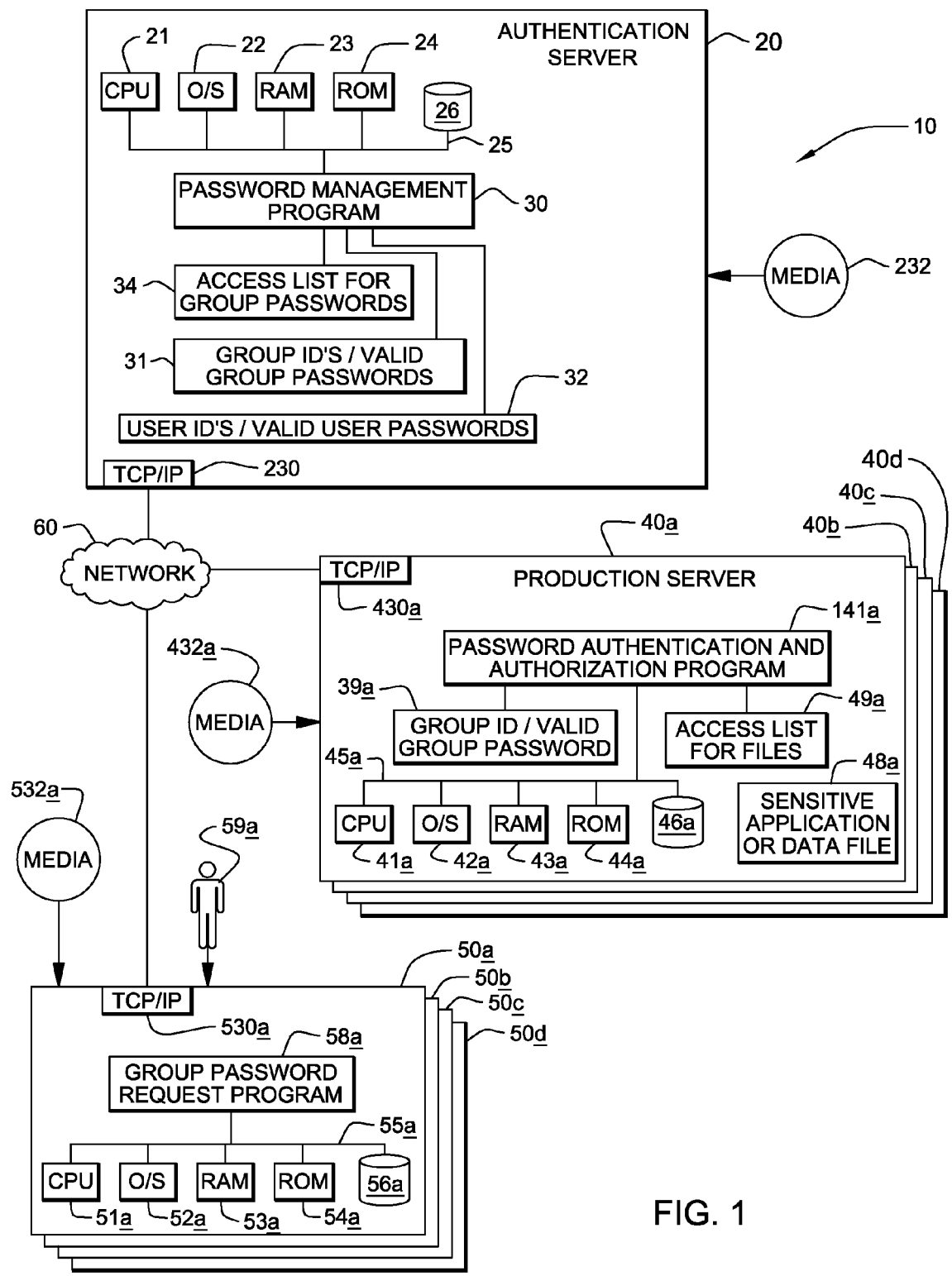
FIG. 1 is a block diagram of a computer system in which the present invention is implemented.

The present invention will now be described in detail with reference to the figures. FIG. 1 illustrates a distributed computer system general designated 10 which includes the present invention. Distributed computer system 10 includes a central authentication server 20 with a known CPU 21, operating system 22, RAM 23 and ROM 24 on a common bus 25 and storage 26. Authentication server 20 also includes a table 31 of valid combinations of Group IDs and corresponding group passwords. For example, one of the Group IDs is "Administrator Team" for root access to a sensitive application or data file 48a such as mount program in respective production server 40a. Authentication server 20 also includes a table 32 of valid combinations of (individual) UserIDs and corresponding individual passwords. Authenticatior server 20 also includes a password management program 30 (stored on computer readable storage disk 26 for execution by CPU 21 via computer readable RAM 23) to authenticate individual UserIDs and corresponding individual passwords and if authentic, furnish a group password for a GroupID if the UserID is so authorized.

Distributed computer system 10 also includes a multiplicity of similar production servers (or other computers) 40a,b,c,d. Production servers 40a,b,c,d include respective CPUs, operating systems, RAM, ROM on common buses and storage such as CPU 41a, operating system 42a, RAM 43a, and ROM 44a on common buses 45a and storage 46a in production servers 40a,b,c,d. Each of the production servers includes one or more sensitive application or data files such as file 48a. Each of the production servers 40a,b,c,d includes a respective, known authentication and authorization program such as program 141a (stored on computer readable storage disk 46a for execution by CPU 41a via computer readable RAM 43a) in production server 40a, a table such as table 39a in production server 40a of valid combinations of Group IDs and corresponding group passwords, and an access control list such as access control list 49a in production server 40a of identities of files and authorizations by GroupID to access the corresponding file. In addition, authentication and authorization program 141a (and the corresponding authentication and authorization programs in production servers 40b,c,d) periodically requests from authentication server 20 the current GroupID for each protected file such as file 48a. Alternately, authentication server 20 initiates sending of updates to the GroupID for each file, whenever the GroupID is changed at the authentication server 20.

Authentication server 20 also includes password management program 30, according to the present invention, to periodically generate a new, valid group password for a corresponding Group ID and provide the group password to production servers (or other computers) 40a,b,c,d for group access to respective sensitive files in the production servers such as file 48a in production server 40a. Password management program 30 can periodically generate the new password automatically or periodically prompt an authorized user (such as an administrator or network security compliance officer) to enter a new group password. Server 20 includes a table 33 which includes a record of one or more challenges and corresponding correct responses for each User ID. Typically, the challenge and correct response for each individual User ID is a request for the individual password and the corresponding individual password. After successfully providing the correct individual password for the UserID from a user workstation 50a,b,c,d, password management program 30 can provide to the individual user at the user workstation 50a,b,c,d, the new valid group password, assuming the UserID is authorized. With this new, valid group password (and knowledge of the Group ID), the individual user from workstation 50a,b,c,d can log-on, i.e. be authenticated to, the production servers 40a,b,c,d to access the respective sensitive files in production servers 40a,b,c,d.

Distributed computer system 10 also includes a multiplicity of the user workstations 50a,b,c,d through which respective users such as user 59a of workstation 50a (such as administrators for the production servers 50a,b,c,d) initially request access to authentication server 20 (to obtain the current group password for the production servers 50a,b,c,d). User workstations 50a,b,c,d include respective CPUs, operating systems, RAM, ROM on common buses and storage such as CPU 51a, operating system 52a, RAM 53a, and ROM 54a on common buses 55a and storage 56a in workstation 50a. User workstations 50a,b,c,d also include respective password request program such as password request program 58a (stored on computer readable storage disk 56a for execution by CPU 51a via computer readable RAM 53a) in workstation 50a according to the present invention by which the respective administrator requests a new root access or other group password based on the user's current (individual) User ID and corresponding individual password.

Authentication server 20, production servers 40a,b,c,d and user workstations 50a,b,c,d are all interconnected by a network 60 such as the Internet, wide area network, local area network, etc.

Figure 2A:
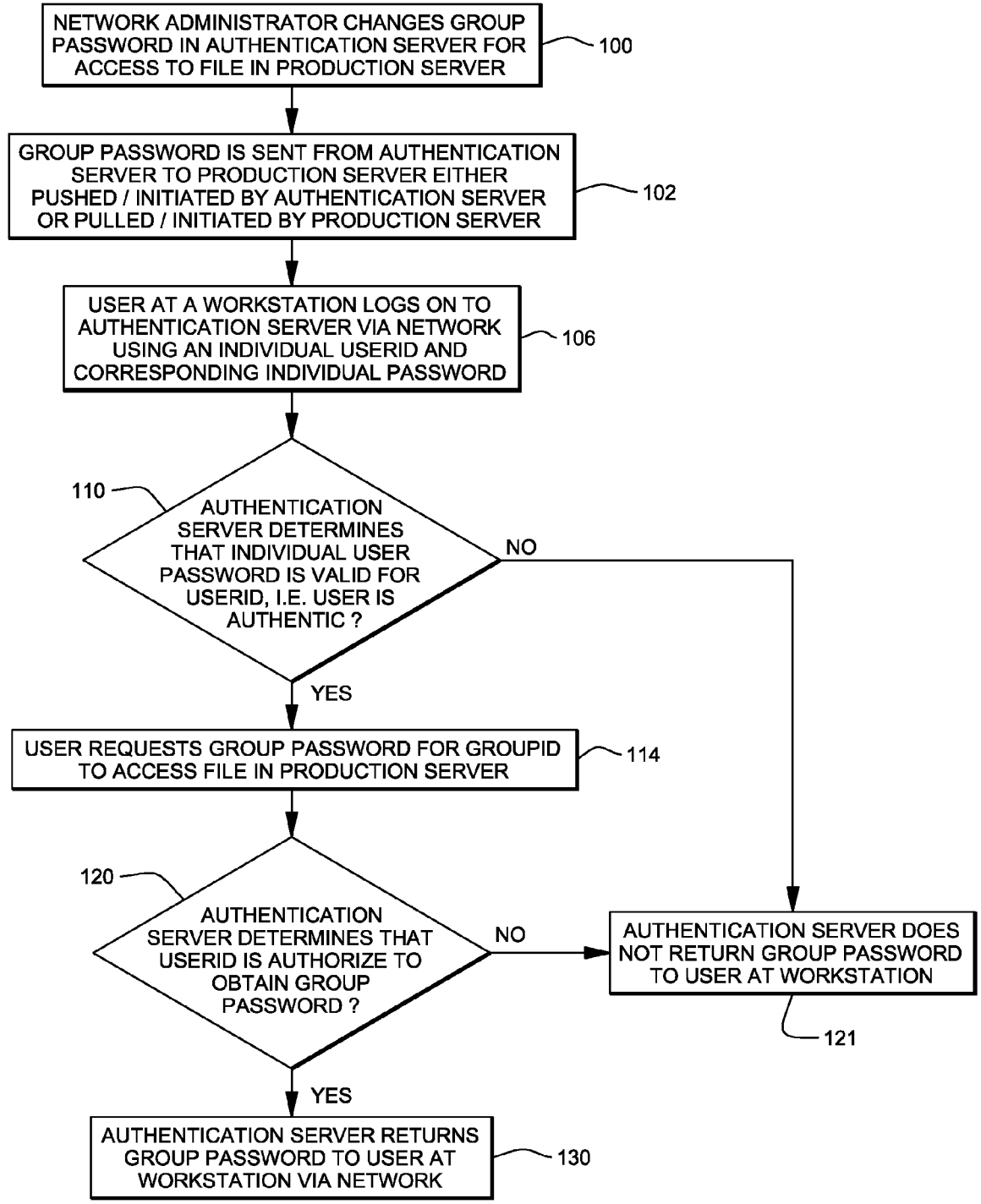
FIGS. 2(A) and 2(B) form a flow chart of function and operation of various programs within computers of FIG. 1, according to the present invention.
Figure 2B:
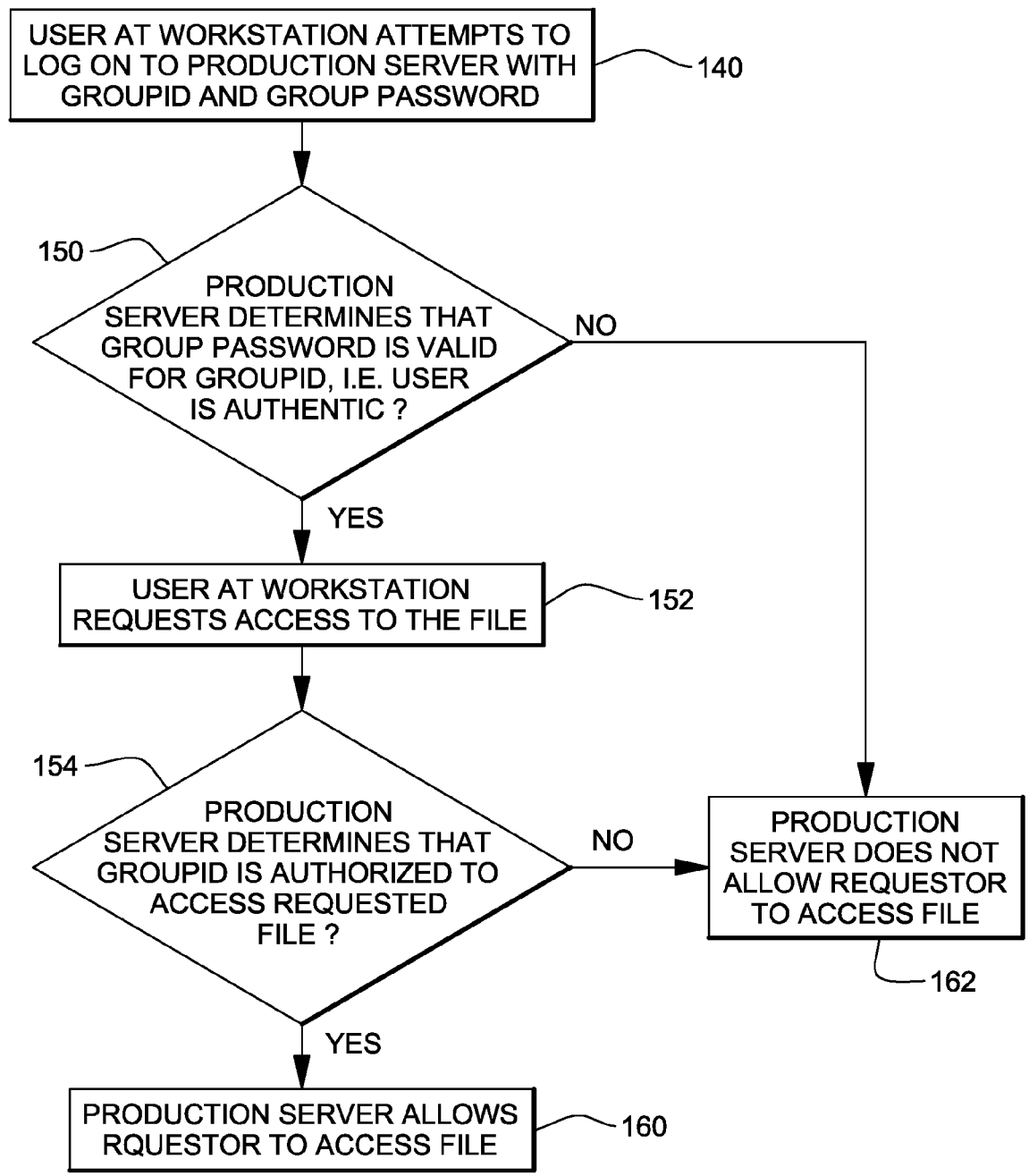

FIGS. 2(A) and 2(B) illustrate function and operation of program 30 in authentication server 20, program 141a in production server 40a and program 58a within workstation 50a in system 10 in more detail. (Analogous processing occurs for users at the other workstations 40b,c,d to obtain a group password from authentication server 20 to access a sensitive file in any of the production servers 40a,b,c,d.) A corporate security compliance officer or network administrator periodically changes in authentication server 20 the root-access or other group password for a Group ID required to access a sensitive file 48a in production server 40a (or other computer) (step 100). The security compliance officer or network administrator changes the group password at authentication server 20 by invoking the password management program 30 and supplying the soon-to-expire group password and GroupID for authentication of the security compliance officer or network administrator as well as the new group password for the same GroupID. Periodically, each production server 40a,b,c,d (or other computer) allowing access by a Group ID to a respective sensitive file such as file 48a requests from the authentication server 20 the current group password for the Group ID (step 102). Alternately, whenever the security compliance officer or network administrator at the authentication server 20 changes the group password for the Group ID (or the authentication server automatically changes the group password for the GroupID) the authentication server 20 sends the group password for the Group ID to each production server (or other computer) 40a,b,c,d allowing access to the respective sensitive files in production servers 40a,b,c,d based on the Group ID and corresponding group password (step 102). During normal operation, a user (for example, an administrator for production server 40a) from a user workstation 50a logs on to authentication server 20 based on the user's individual UserID and corresponding (individual's/user's) password (step 106). In response, the password management program 30 in authentication server 20 attempts to authenticate the individual UserID and corresponding individual/user password by reference to table 32 (step 110). If the user's individual password is valid for the UserID (decision 110, yes branch), then the user specifies a Group ID and requests the current root-access or other group password for the Group ID for access to a sensitive file 48a in production server 40a (or other computer) (step 114). (Alternately, the user can request the group password concurrent with the request in step 106 to log on to the authentication server based on the UserID and corresponding individual/user password.) In response to the request for the group password, the password management program 30 in authentication server 20 determines if the individual UserID is authorized to receive the group password for the GroupID by reference to an access list 34 (decision 120). If so (decision 120, yes branch), then authentication server 20 returns to the user at user workstation 50a the group password for the Group ID for access to the sensitive file 48a in production server 40a (or other computer) (step 130). The user then attempts to log on to the production server 40a (or other computers) with the Group ID and corresponding group password (step 140). In response, password authentication and authorization program 141a in the production server 40a determines based on table 39a if the combination of GroupID and group password are valid. i.e. is the user authentic (decision 150). If so (decision 150, yes branch), then the user requests access to the sensitive file (step 152). In response, password authentication and authorization program 141a in the production server 40a determines based on table 49a if the GroupID is authorized to access the file requested by the user (decision 154). If so (decision 154, yes branch), then password authentication and authorization program 141a grants the user access to the requested file (step 160). (Alternately, step 152 can be performed concurrent with step 140.)

However, if the group password is not valid for the GroupID (decision 150, no branch) or the GroupID is not authorized to access the sensitive file 48a (decision 154, no branch), then program 141a does not grant the user access to the requested file (step 162).

Referring again to decision 120, no branch where the user is not authorized to receive the group password, then password management program 30 does not return the group password to the user (step 121).

With the foregoing system and process, each administrator/user can acquire the current group password when needed, and need not to keep a tangible copy of the group password.

Program 30 can be loaded into authentication server from a computer readable media 232 such as magnetic tape or disk, optical media, DVD, memory stick, etc. or downloaded from the network 60 via TCP/IP adapter card 230.

Program 141a can be loaded into production server 40a from a computer readable media 432a such as magnetic tape or disk, optical media, DVD, memory stick, etc. or downloaded from the network 60 via TCP/IP adapter card 430a.

Program 58a can be loaded into respective user workstation 50a from a computer readable media 532a such as magnetic tape or disk, optical media, DVD, memory stick, etc. or downloaded from the network 60 via TCP/IP adapter card 530a.

Based on the foregoing, a system, method and program product for authentication and access control have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A method for managing a production server, the method comprising the steps of:
   an authentication server sending to the production server via a network a group password for a GroupID for administrative root access to an administrative root file in the production server;
   the authentication server subsequently receiving from a human administrator at a workstation via a network an individual human administrator ID and a corresponding individual password for human administrator and a request for the group password for the GroupID for administrative root access to the administrative root file in the production server protected by the group password, and in response, the authentication server authenticating the individual human administrator ID with the corresponding individual password and determining from an access control list for administrative root access to the production server that the human administrator is authorized to receive the group password, and in response, the authentication server returning to the workstation the group password for the GroupID; and
   subsequently, the production server receiving from the human administrator at the workstation via a network the group password and GroupID and a request to access the administrative root file in the production server protected by the group password, and in response, the production server authenticating the GroupID with the group password, determining from another access control list containing identities of files and respective authorizations by GroupID that the human administrator is authorized to access the administrative root file, and in response, the production server granting the human administrator access to the administrative root file.

2. The method of claim 1 wherein:
   the authentication server applies a security policy for the production server by approximately periodically sending to the production server via the network replacement group passwords for the GroupID for administrative root access to the administrative root file in the production server; and
   the production server replaced a group password, previously sent by the authentication server pursuant to the security policy, with the first said group password which differed from the group password previously sent by the authentication server pursuant to the security policy.

3. The method of claim 1 wherein the group password and Group ID provide access to a plurality of different types of administrative root files.

4. The method of claim 1 wherein the administrative root file is a password program for the production server.

5. The method of claim 4 wherein the requested access is to execute the password program.

6. The method of claim 1 wherein the administrative root file is a mount program for the production server.

7. The method of claim 6 wherein the requested access is to execute the mount program.

8. A computer program product for managing a production server, the computer program product comprising:
   a computer readable storage device(s);
   first program instructions stored on said device(s) for execution at an authentication server to initiate sending to the production server via a network a group password for a GroupID for administrative root access to an administrative root file in the production server;
   second program instructions for execution on the authentication server to subsequently receive from a human administrator at a workstation via a network an individual human administrator ID and a corresponding individual password for the human administrator and a request for the group password for the GroupID for administrative root access to the administrative root file in the production server protected by the group password, and in response, authenticate the individual human administrator ID with the corresponding individual password and determine from an access control list for administrative root access to the production server that the human administrator is authorized to receive the group password, and in response, return to the workstation the group password for the GroupID; and third program instructions stored on said device(s) for execution in the production server to subsequently receive from the human administrator at the workstation via a network the group password and GroupID and GroupID and a request to access the administrative root file in the production server protected by the group password, and in response, authenticate the GroupID with the group password, determine from another access control list containing identities of files and respective authorizations by GroupID that the human administrator is authorized to access the administrative root file, and in response, grant the human administrator access to the administrative root file.

9. The computer program product of claim 8 further comprising:

fourth program instructions for execution in the authentication server to apply a security policy for the production server by approximately periodically sending to the production server via the network replacement group passwords for the GroupID for administrative root access to the administrative root file in the production server; and fifth program instructions for execution in the production server to replace a group password, previously sent by the fourth program instructions in the authentication server pursuant to the security policy, with the first said group password which differed from the group password previously sent by fourth program instructions in the authentication server pursuant to the security policy; and wherein the fourth and fifth program instructions are stored on the computer readable storage device(s).

10. The computer program product of claim 8 wherein the group password and Group ID provide access to a plurality of different types of administrative root files.

11. The computer program product of claim 8 wherein the administrative root file is a password program for the production server.

12. The computer program product of claim 11 wherein the requested access is to execute the password program.

13. The computer program product of claim 8 wherein the administrative root file is a mount program for the production server.

14. The computer program product of claim 13 wherein the requested access is to execute the mount program.

15. A computer system for managing a production server, the computer system comprising:

a central processor unit ("CPU"), a computer readable memory and a computer readable storage device(s);

first program instructions for execution at an authentication server to initiate sending to the production server via a network a group password for a GroupID for administrative root access to an administrative root file in the production server;

second program instructions for execution on the authentication server to subsequently receive from a human administrator at a workstation via a network an individual human administrator ID and a corresponding individual password for the human administrator and a request for the group password for the GroupID for administrative root access to the administrative root file in the production server protected by the group password, and in response, authenticate the individual human administrator ID with the corresponding individual password and determine from an access control list for administrative root access to the production server that the human administrator is authorized to receive the group password, and in response, return to the workstation the group password for the GroupID; and third program instructions for execution in the production server to subsequently receive from the human administrator at the workstation via a network the group password and GroupID and a request to access the administrative root file in the production server protected by the group password, and in response, authenticate the GroupID with the group password, determine from another access control list containing identities of files and respective authorizations by GroupID that the human administrator is authorized to access the administrative root file, and in response, grant the human administrator access to the administrative root file; and wherein the first, second and third program instructions are stored on the computer readable storage device(s) for execution by the CPU via the computer readable memory.

16. The computer system of claim 15 further comprising:

fourth program instructions for execution in the authentication server to apply a security policy for the production server by approximately periodically sending to the production server via the network replacement group passwords for the GroupID for administrative root access to the administrative root file in the production server; and fifth program instructions for execution in the production server to replace a group password, previously sent by the fourth program instructions in the authentication server pursuant to the security policy, with the first said group password which differed from the group password previously sent by fourth program instructions in the authentication server pursuant to the security policy; and wherein the fourth and fifth program instructions are stored on the computer readable storage device(s) for execution by the CPU via the computer readable memory.

17. The computer system of claim 15 wherein the group password and Group ID provide access to a plurality of different types of administrative root files.

18. The computer system of claim 15 wherein the administrative root file is a password program for the production server.

19. The computer system of claim 18 wherein the requested access is to execute the password program.

20. The computer system of claim 15 wherein the administrative root file is a mount program for the production server.

21. The computer system of claim 20 wherein the requested access is to execute the mount program.

* * * * *